United States Patent
Chen

(10) Patent No.: US 11,967,687 B2
(45) Date of Patent: Apr. 23, 2024

(54) SAFE DISCHARGE METHOD FOR WASTE LITHIUM ION BATTERIES

(71) Applicant: SHENZHEN JIECHENG NICKEL COBALT NEW ENERGY TECHNOLOGY CO., LTD., Shenzhen (CN)

(72) Inventor: Meimei Chen, Shantou (CN)

(73) Assignee: SHENZHEN JIECHENG NICKEL COBALT NEW ENERGY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/350,752

(22) Filed: Jul. 12, 2023

(65) Prior Publication Data

US 2023/0352758 A1  Nov. 2, 2023

Related U.S. Application Data

(63) Continuation of application No. PCT/CN2021/142417, filed on Dec. 29, 2021.

(30) Foreign Application Priority Data

Jan. 13, 2021 (CN) .......................... 202110040330.3

(51) Int. Cl.
H01M 10/54 (2006.01)
B09B 3/32 (2022.01)
B09B 101/16 (2022.01)

(52) U.S. Cl.
CPC .............. *H01M 10/54* (2013.01); *B09B 3/32* (2022.01); *B09B 2101/16* (2022.01)

(58) Field of Classification Search
CPC ....... H01M 10/54; B09B 3/32; B09B 2101/16
See application file for complete search history.

(56) References Cited

U.S. PATENT DOCUMENTS

2020/0078796 A1* 3/2020 Kochhar ................... B03B 9/06
2021/0143489 A1* 5/2021 Sloop ................ H01M 10/4235

FOREIGN PATENT DOCUMENTS

CN   1943059 A    4/2007
CN   105098281 A  11/2015
(Continued)

OTHER PUBLICATIONS

International Search Report issued in corresponding International application No. PCT/CN2021/142417, dated Mar. 30, 2022.
(Continued)

*Primary Examiner* — Michael McCullough
*Assistant Examiner* — Kalyanavenkateshware Kumar

(57) ABSTRACT

A safe discharge method for waste lithium ion batteries includes steps of mixing the waste lithium ion batteries and conductive particles in a discharge chamber to make the waste lithium ion batteries to discharge, calculating an internal resistance of the discharge chamber according to pressurization pressure; calculating a discharge rate of the waste lithium ion batteries; dynamically adjusting the pressurization pressure to keep the discharge rate of the waste lithium ion batteries to be 0.1-3 C; monitoring an internal temperature of the discharge chamber in real time; when the internal temperature is greater than an early warning temperature, reducing the pressurization pressure by 20%-60%; when the internal temperature is greater than a warning temperature, relieving the pressurization pressure to 0 N, reducing the pressurization pressure by 60%-90% after the internal temperature drops below the early warning temperature, and re-compacting to discharge the waste lithium ion batteries.

6 Claims, 1 Drawing Sheet

Discharge time (h)

(56) References Cited

FOREIGN PATENT DOCUMENTS

| | | |
|---|---|---|
| CN | 106816663 A | 6/2017 |
| CN | 110656246 A | 1/2020 |
| CN | 111370794 A | 7/2020 |
| CN | 111822140 A | 10/2020 |
| CN | 211719735 U | 10/2020 |
| CN | 211907624 U | 11/2020 |
| CN | 112864486 A | 5/2021 |
| JP | 2004355954 A | 12/2004 |
| JP | 2018147838 A | 9/2018 |

OTHER PUBLICATIONS

Written Opinion of the International Search Authority in corresponding International application No. PCT/CN2021/142417.

* cited by examiner

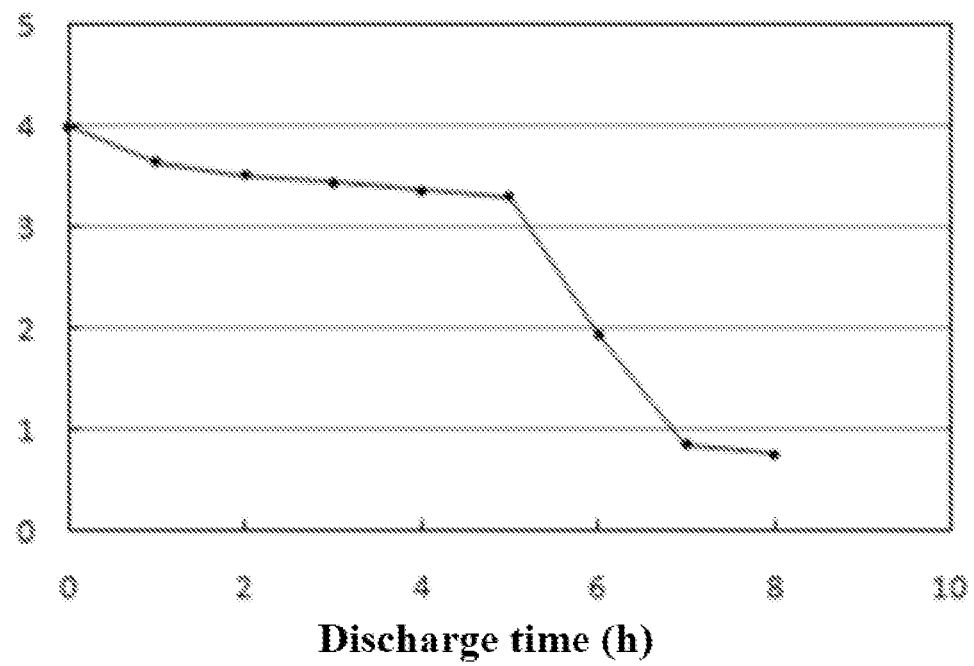

SAFE DISCHARGE METHOD FOR WASTE LITHIUM ION BATTERIES

TECHNICAL FIELD

The present disclosure relates to a technical field of recycling and pretreatment of waste lithium ion batteries, and in particular to a safe discharge method for waste lithium ion batteries.

BACKGROUND

Lithium ion batteries have advantages of high energy density, no memory effect, and excellent electrical performance, and are widely used in electronic products, new energy vehicles, energy storage, and other fields. By the end of 2019, there are more than 3.81 million new energy vehicles in China. Service life of the lithium ion batteries is generally 3-8 years. At present, the lithium ion batteries gradually enter a large-scale decommissioning period, and recycling and disposal of the lithium ion batteries is imminent.

At present, a recycling method of the waste lithium ion batteries in China mainly comprises processes such as dismantling, crushing, sorting, element extraction, and etc., which realizes recycling and reuse of valuable resources such as nickel, cobalt, manganese, and lithium. In these processes, the waste lithium ion batteries must first be safely crushed in a charged state or safely discharged. Safe crushing of charged waste lithium ion batteries is still in a research stage, and main methods thereof are a liquid nitrogen freezing crushing method and an underwater crushing method. The liquid nitrogen freezing crushing method reduces risk factors of a crushing process. However, since the lithium is embedded in a negative electrode of the waste lithium ion batteries, there is still a risk of explosion of crushed waste lithium ion batteries. The underwater crushing method is relatively safe through a cooling effect of water, but a capacity of the underwater crushing of the waste lithium ion batteries is generally low, and electrolyte of the crushed waste lithium ion batteries may enter the water, which brings a series of problems such as complex wastewater treatment and high cost. Safe discharge technology mainly comprises a chemical discharge method and a physical discharge method. The chemical discharge method is mainly based on salt water discharge, which consumes electrical energy of the waste lithium ion batteries through electrolysis of salt water, and specific processes are disclosed in patent documents such as CN106058358A, CN104882646A, CN110391474A, CN108808143B, and CN110635185. The chemical discharge method has advantages of relatively mild discharge processes and low treatment cost and is widely used in industrialization. However, the chemical discharge method is prone to generate hydrogen, oxygen, chlorine, other waste gases, and hazardous waste liquid (e.g., electrolyte). Further, the chemical discharge method is easy to corrode and pollute battery shells and internal electrodes, has a slow processing speed (a discharge cycle is generally 3-5 days), and is not suitable for soft pack batteries.

The physical discharge method mainly comprises a resistive load discharge method and a conductive powder discharge method. The resistive load discharge method is disclosed in CN patents, such as CN108550943A and CN106207297B. Although the resistive load discharge method has a fast discharge speed and the waste lithium ion batteries are thoroughly discharged by the resistive load discharge method, the resistive load discharge method still has problems such as elevated temperature of the waste lithium ion batteries during discharge, poor battery type compatibility, and low degree of automatic operation of load connection. The conductive powder discharge method is disclosed in CN patents, such as CN106816663A, CN109103534A and CN110176644A. The waste lithium ion batteries are discharged through a conductive medium (e.g., conductive carbon powder or graphite powder) by the conductive powder discharge method. The conductive powder discharge method is suitable for most battery types, does not generate waste water, waste gases, or residues during a discharge process, and is easy to operate. However, contact between the conductive powder is poor, a contact resistance is large, and a discharge speed is slow. Moreover, the conductive powder is easy to raise dust and pollute environment during a loading process and an unloading process, and the conductive powder is easy to adhere to battery surfaces and pollute the waste lithium ion batteries during the discharge process.

Therefore, in order to realize rapid, safe, and highly compatible discharge of the waste lithium ion batteries, it is necessary to solve defects of the above-mentioned recycling methods.

SUMMARY

A purpose of the present disclosure is to overcome defects in the prior art and provide a safe discharge method for waste lithium ion batteries, which is simple to handle, low in cost, realizes industrial production, and realizes intelligent automatic control.

To achieve the above purpose, the present disclosure provides the safe discharge method for the waste lithium ion batteries. The safe discharge method comprises following steps:

S1: uniformly mixing the waste lithium ion batteries and conductive particles in a discharge chamber according to a weight ratio of 1:5-2:1;

S2: compacting the waste lithium ion batteries and the conductive particles at a pressurization pressure of 1000-100000 Pa, so that the waste lithium ion batteries discharge; calculating an internal resistance of the discharge chamber in real time according to the pressurization pressure; calculating a discharge rate of the waste lithium ion batteries in combination with a battery voltage and a rated capacity of the waste lithium ion batteries; dynamically adjusting the pressurization pressure to keep the discharge rate of the waste lithium ion batteries to be 0.1-3 C.; monitoring an internal temperature of the discharge chamber in real time; when the internal temperature of the discharge chamber is greater than an early warning temperature, reducing the pressurization pressure by 20%-60%; when the internal temperature of the discharge chamber is greater than a warning temperature, relieving the pressurization pressure to 0 Pa, reducing the pressurization pressure by 60%-90% after the internal temperature of the discharge chamber drops below the early warning temperature, and re-compacting the waste lithium ion batteries and the conductive particles to discharge the waste lithium ion batteries; and S3: completing discharge of the waste lithium ion batteries, when the battery voltage of the waste lithium ion batteries is reduced to 0.5-1.5 V, or when the waste lithium ion batteries are discharged for 1-4 h after the internal temperature of discharge chamber is reduced to room temperature.

Furthermore, in the step S1, the conductive particles are one or more of copper particles, aluminum particles, iron particles, alloy particles, and carbon particles. The alloy particles are copper-iron-aluminum alloy particles.

Furthermore, a resistance of the conductive particles ranges from 0.1-20Ω. A particle size of the conductive particles ranges from 1-10 mm.

Furthermore, in the step S2, a process of dynamically adjusting the pressurization pressure is represented by:

$$C=U/(R*Ca);$$

$$R=R_0+R_j;$$

$$R_j=K/F^m.$$

C is the discharge rate of the waste lithium ion batteries. U is the battery voltage of the waste lithium ion batteries. Ca is the rated capacity of the waste lithium ion batteries. R is the internal resistance of the discharge chamber. $R_0$ is the resistance of the conductive particles. $R_j$ is a contact resistance between the conductive particles. F is the pressurization pressure. K is a constant related to a contact material, a contact surface processing method, and a contact surface condition. m is a constant related to a contact form, and m is 0.5-0.7.

Furthermore, in the step S2, during discharging of the waste lithium ion batteries, the discharge chamber is blown by an air cooling device to dissipate heat.

Furthermore, an air volume of the air cooling device ranges from 50~2000 m³/h.

Furthermore, in the step S2, the early warning temperature is 60° C.

Furthermore, in the step S2, the warning temperature is 80° C.

Compared with the prior art, the particle size of the conductive particles of the present disclosure ranges from 1-10 mm, and the resistance of the conductive particles ranges from 0.1-20Ω, which solves problems of large resistance, easy dusting, and adhesion of the conductive powder, and greatly improves discharge efficiency of the waste lithium ion batteries (2-48 h to complete the discharge) and environmental friendliness.

In the present disclosure, a mixture of the waste lithium ion batteries and the conductive particles is compacted by the pressurization pressure of 1000-100000 Pa, thereby ensuring good contact between the waste lithium ion batteries and the conductive particles. When the pressurization pressure is too large, the conductive particles press battery housings of the waste lithium ion batteries, which may cause internal short circuit of the waste lithium ion batteries to cause danger in serious cases. Therefore, the pressurization pressure of the present disclosure is 1000-100000 Pa, which not only ensures a lower contact resistance, but also does not compact the waste lithium ion batteries to cause damage. Meanwhile, the pressurization pressure is automatically adjusted by monitoring the internal resistance and the internal temperature of the discharge chamber, so that a discharge speed is adjusted, and the discharge speed is controllable.

The internal temperature of the discharge chamber of the present disclosure is monitored in real time, and the pressurization pressure is automatically adjusted through the internal temperature of the discharge chamber. When the internal temperature of the discharge chamber is greater than 60° C., the pressurization pressure is automatically lowered to prevent the internal temperature of the discharge chamber from rising further. When the internal temperature of the discharge chamber is greater than 80° C., the pressurization pressure is automatically relieved to ensure safety of the waste lithium ion batteries.

In the present disclosure, the air cooling device blows the discharge chamber to dissipate heat, thereby improving heat dissipation efficiency.

Raw materials and operations of the present disclosure are simple, do not generate waste water, waste gases, or residues, and are beneficial to industrialized large-scale production.

The safe discharge method of the present disclosure meets needs of the current industry and has very broad application prospects.

BRIEF DESCRIPTION OF DRAWINGS

FIG. 1 is a graph of a battery voltage of waste lithium ion batteries in Embodiment 1 of the present disclosure as a function of time.

DETAILED DESCRIPTION

In order to make objectives, technical solutions, and advantages of the present disclosure clearer, the following further describes the present disclosure in detail with reference to accompanying drawings and embodiments. It should be understood that the specific embodiments described here are only used to explain the present disclosure, but not to limit the present disclosure.

The present disclosure provides a safe discharge method for waste lithium ion batteries. The safe discharge method comprises following steps:

S1: uniformly mixing the waste lithium ion batteries and conductive particles in a discharge chamber according to a weight ratio of 1:5-2:1;

Specifically, a layer of conductive particles is laid in the discharge chamber, then waste lithium ion battery cells or modules (i.e., the waste lithium ion batteries) with exposed positive and negative electrodes are placed in the discharge chamber, and finally remaining conductive particles are added into the discharge chamber. Then, the waste lithium ion batteries and conductive particles are uniformly mixed.

A particle size of the conductive particles is 1-10 mm, and the conductive particles are spherical, cylindrical, or irregular in shape. A resistance of the conductive particles ranges from 0.1-20Ω.

Compared with the conductive powder in the prior art, the conductive particles of the present disclosure have a larger particle size, smaller contact resistance between particles, adjustable discharge resistance, and do not generate dust or pollute battery surfaces of the waste lithium ion batteries. Specifically, the conductive particles in the present disclosure are one or more of copper particles, aluminum particles, iron particles, alloy particles, and carbon particles. The alloy particles are copper-iron-aluminum alloy particles.

Although the conductive particles and the waste lithium ion batteries are uniformly mixed, contact between pole posts of the positive and negative electrodes of the waste lithium ion batteries and the conductive particles is not close, and contact between the conductive particles is not close, which means that a contact resistance is large and discharge efficiency is low.

S2: compacting the waste lithium ion batteries and the conductive particles at a pressurization pressure of 1000-100000 Pa, so that the waste lithium ion batteries discharges, ensuring good contact between the waste lithium ion batteries and the conductive particles; calculating an internal resistance of the discharge chamber in real time according to the pressurization pressure; calculating a discharge rate of the waste lithium ion batteries in combination with a battery voltage and a rated capacity of the waste lithium ion batteries; dynamically adjusting the pressurization pressure to keep the discharge rate of the waste lithium ion batteries to be 0.1-3 C;

A process of dynamically adjusting the pressurization pressure is represented by:

$$C=U/(R*Ca);$$

$$R=R_0+R_j;$$

$$R_j=K/F^m.$$

C is the discharge rate of the waste lithium ion batteries. U is the battery voltage of the waste lithium ion batteries. Ca is the rated capacity of the waste lithium ion batteries. R is the internal resistance of the discharge chamber. $R_0$ is the resistance of the conductive particles. $R_j$ is a contact resistance between the conductive particles. F is the pressurization pressure. K is a constant related to a contact material, a contact surface processing method, and a contact surface condition. m is a constant related to a contact form, and m is 0.5-0.7. Those skilled in the art are able to calculate the discharge rate in real time based on measured voltage and measured pressurization pressure applied on the waste lithium ion batteries. Those skilled in the art are able to increase or decrease the pressurization pressure according to a difference between the discharge rate and the expected setting range.

At the same time, monitoring an internal temperature of the discharge chamber in real time; when the internal temperature of the discharge chamber is greater than an early warning temperature, reducing the pressurization pressure by 20%-60%; when the internal temperature of the discharge chamber is greater than a warning temperature, relieving the pressurization pressure to 0 Pa, reducing the pressurization pressure by 60%-90% after the internal temperature of the discharge chamber drops below the early warning temperature, and re-compacting the waste lithium ion batteries and the conductive particles to discharge the waste lithium ion batteries.

The discharge chamber is blown by an air cooling device to dissipate heat to prevent the internal temperature from rising too fast. An air volume of the air cooling device ranges from 50-2000 m³/h. By monitoring the internal temperature and the pressurization pressure of the discharge chamber, the internal temperature of the discharge chamber is always no more than 80° C. during the discharge process, ensuring safety of the discharge process.

S3: completing discharge of the waste lithium ion batteries, when the battery voltage of the waste lithium ion batteries is reduced to 0.5-1.5 V, or when the waste lithium ion batteries are discharged for 1-4 h after the internal temperature of discharge chamber is reduced to room temperature.

The safe discharge method for the waste lithium ion batteries is applied to a field of recycling of the waste lithium ion batteries, and safe discharge treatment is carried out before the waste lithium ion batteries is physically crushed and sorted, so that the safety of a physical crushing and sorting process is ensured.

Embodiment 1

The present disclosure provides the safe discharge method for waste lithium ion batteries. The safe discharge method comprises following steps:
S1: A layer of spherical aluminum particles (i.e., the conductive particles) with a weight of 2 kg, a particle size of 5 mm, and a resistance of 0.1Ω is laid in the discharging chamber, then 2 kg of the waste lithium ion batteries are uniformly placed in the discharging chamber. The waste lithium ion batteries are the waste lithium ion batteries with 8650 steel shells. The rated capacity of the waste lithium ion batteries is 3 Ah and an open-circuit voltage of the waste lithium ion batteries is 3.6 V. Remaining spherical aluminum particles are added. The spherical aluminum particles and the waste lithium ion batteries are uniformly mixed by hand. A total weight of the aluminum particles is 4 kg.
S2: The waste lithium ion batteries and the conductive particles are compacted at the pressurization pressure of 1000 Pa, so that the waste lithium ion batteries discharge. The internal resistance of the discharge chamber calculated is 5Ω according to the pressurization pressure. The discharge rate of the waste lithium ion batteries calculated is 0.2 C according to the battery voltage and the rated capacity of the waste lithium ion batteries. The pressurization pressure is dynamically adjusted to keep the discharge rate of the waste lithium ion batteries to be 0.2 C.

The discharge chamber is blown by the air cooling device to dissipate heat. The air volume of the air cooling device ranges from 50 m³/h. At the same time, the internal temperature of the discharge chamber is monitored in real time, and the internal temperature of the discharge chamber is always lower than 60° C.
S3: The internal temperature of the discharge chamber is reduced to the room temperature after 7 h of discharge of the waste lithium ion batteries, and the waste lithium ion batteries continue to discharge for 1 h to complete discharge of the waste lithium ion batteries.

A variation curve of the battery voltage of the waste lithium ion batteries during a discharge process in the embodiment is shown in FIG. 1. After 8 hours of discharge, the battery voltage drops to less than 1.0 V.

The safe discharge method for the waste lithium ion batteries is applied to the field of recycling of the waste lithium ion batteries, and the safe discharge treatment is carried out before the waste lithium ion batteries is physically crushed and sorted, so that the safety of the physical crushing and sorting process is ensured.

Embodiment 2

The present disclosure provides the safe discharge method for waste lithium ion batteries. The safe discharge method comprises following steps:
S1: A layer of cylindrical graphite particles (i.e., the conductive particles) with a weight of 0.5 kg, a particle size of 1 mm, and a resistance of 20Ω is laid in the discharging chamber, then 1 kg of the waste lithium ion batteries are uniformly placed in the discharging chamber. The waste lithium ion batteries are soft package waste lithium ion batteries. The rated capacity of the waste lithium ion batteries is 20 Ah and the open-circuit voltage of the waste lithium ion batteries is 3.7 V. Remaining cylindrical graphite particles are added. The cylindrical graphite particles and the soft package waste lithium batteries are mixed by vibration. A total weight of the cylindrical graphite particles is 1 kg.

S2: The waste lithium ion batteries and the conductive particles are compacted at the pressurization pressure of 5000 Pa, so that the waste lithium ion batteries discharge. The internal resistance of the discharge chamber calculated is 0.35Ω according to the pressurization pressure. The discharge rate of the waste lithium ion batteries calculated is 0.5 C according to the battery voltage and the rated capacity of the waste lithium ion batteries. The pressurization pressure is dynamically adjusted to keep the discharge rate of the waste lithium ion batteries to be 0.5 C.

The discharge chamber is blown by the air cooling device to dissipate heat. The air volume of the air cooling device ranges from 500 m³/h. At the same time, the internal temperature of the discharge chamber is monitored in real time. After the waste lithium ion batteries are discharged for half an hour, the internal temperature of the discharge chamber exceeds the early warning temperature of 60° C., and the pressurization pressure is automatically adjusted to 4000 Pa and is maintained. During this process, the internal temperature of the discharge chamber reduces gradually.

S3: The internal temperature of the discharge chamber is reduced to the room temperature after 8 h of discharge of the waste lithium ion batteries, and the waste lithium ion batteries continue to discharge for 4 h to complete discharge of the waste lithium ion batteries.

The safe discharge method for the waste lithium ion batteries is applied to the field of recycling of the waste lithium ion batteries, and the safe discharge treatment is carried out before the waste lithium ion batteries is physically crushed and sorted, so that the safety of the physical crushing and sorting process is ensured.

Embodiment 3

The present disclosure provides the safe discharge method for waste lithium ion batteries. The safe discharge method comprises following steps:

S1: A layer of irregularly shaped iron particles (i.e., the conductive particles) with a weight of 2 kg, a particle size of 10 mm and a resistance of 10Ω is laid in the discharging chamber, then 1 kg of the waste lithium ion batteries are uniformly placed in the discharging chamber. The waste lithium ion batteries are waste lithium ion batteries having aluminum shells. The rated capacity of the waste lithium ion batteries is 20 Ah and the open-circuit voltage of the waste lithium ion batteries is 4.0 V. Remaining irregularly shaped iron particles are added. The irregularly shaped iron particles and the waste lithium batteries are mixed by vibration. A total weight of the irregularly shaped iron particles is 5 kg.

S2: The waste lithium ion batteries and the conductive particles are compacted at the pressurization pressure of 100000 Pa, so that the waste lithium ion batteries discharge. The internal resistance of the discharge chamber calculated is 0.2352 according to the pressurization pressure. The discharge rate of the waste lithium ion batteries calculated is 0.8 C according to the battery voltage and the rated capacity of the waste lithium ion batteries. The pressurization pressure is dynamically adjusted to keep the discharge rate of the waste lithium ion batteries to be 0.8 C.

The discharge chamber is blown by the air cooling device to dissipate heat. The air volume of the air cooling device ranges from 200 m³/h. At the same time, the internal temperature of the discharge chamber is monitored in real time. After the waste lithium ion batteries are discharged for half an hour, the internal temperature of the discharge chamber exceeds the early warning temperature of 60° C., so the pressurization pressure is automatically adjusted to 40000 Pa and is maintained for 10 minutes. Then, the internal temperature of the discharge chamber exceeds the warning temperature of 80° C., the pressurization pressure is relieved. After cooling the discharge chamber for 20 minutes, the internal temperature of the discharge chamber drops below 60° C., the pressurization pressure is automatically adjusted to 10000 Pa, and the waste lithium ion batteries are re-compacted for discharge. Then, the internal temperature of the discharge chamber maintains lower than 60° C.

S3: The internal temperature of the discharge chamber is reduced to the room temperature after 10 h of discharge of the waste lithium ion batteries, and the battery voltage of the waste lithium ion batteries 1.5 V to complete discharge of the waste lithium ion batteries.

The safe discharge method for the waste lithium ion batteries is applied to the field of recycling of the waste lithium ion batteries, and the safe discharge treatment is carried out before the waste lithium ion batteries is physically crushed and sorted, so that the safety of the physical crushing and sorting process is ensured.

Embodiment 4

The present disclosure provides the safe discharge method for waste lithium ion batteries. The safe discharge method comprises following steps:

S1: A layer of spherical copper particles and copper-iron-aluminum alloy particles (i.e., the conductive particles) with a weight of 1 kg, a particle size of 10 mm and a resistance of 10Ω is laid in the discharging chamber, then 4 kg of the waste lithium ion batteries are uniformly placed in the discharging chamber. The waste lithium ion batteries are waste lithium ion batteries having 18650 steel shells. The rated capacity of the waste lithium ion batteries is 2 Ah and the open-circuit voltage of the waste lithium ion batteries is 4.2 V. Remaining spherical copper particles and copper-iron-aluminum alloy particles are added. The spherical copper particles and copper-iron-aluminum alloy particles and the waste lithium batteries are mixed by vibration. A total weight of the spherical copper particles and copper-iron-aluminum alloy particles is 2 kg.

S2: The waste lithium ion batteries and the conductive particles are compacted at the pressurization pressure of 10000 Pa, so that the waste lithium ion batteries discharge. The internal resistance of the discharge chamber calculated is 0.7Ω according to the pressurization pressure. The discharge rate of the waste lithium ion batteries calculated is 3 C according to the battery voltage and the rated capacity of the waste lithium ion batteries. The pressurization pressure is dynamically adjusted to keep the discharge rate of the waste lithium ion batteries to be 3 C. The discharge chamber is blown by the air cooling device to dissipate heat. The air volume of the air cooling device ranges from 100 m³/h. At the same time, the internal temperature of the discharge chamber is monitored in real time. After the waste lithium ion batteries are discharged for half an hour, the internal temperature of the discharge chamber exceeds the early warning temperature of 60° C., so the pressurization pressure is automatically adjusted to 60000 Pa and is maintained for 10 minutes. Then, the internal temperature of the discharge chamber exceeds the warning temperature of 80° C., the pressurization pressure is relieved. After cooling the discharge chamber for 30 minutes, the internal temperature of the discharge chamber drops below 60° C., the pressurization pressure is automatically adjusted to 40000 Pa, and the waste lithium ion batteries are re-compacted for discharge. Then, the internal temperature of the discharge chamber maintains lower than 60° C.

S3: The internal temperature of the discharge chamber is reduced to the room temperature after 12 h of discharge of the waste lithium ion batteries, and the battery voltage of the waste lithium ion batteries 0.5 V to complete discharge of the waste lithium ion batteries.

The safe discharge method for the waste lithium ion batteries is applied to the field of recycling of the waste lithium ion batteries, and the safe discharge treatment is carried out before the waste lithium ion batteries is physically crushed and sorted, so that the safety of the physical crushing and sorting process is ensured.

Embodiment 5

The present disclosure provides the safe discharge method for waste lithium ion batteries. The safe discharge method comprises following steps:

S1: A layer of spherical carbon particles and iron particles (i.e., the conductive particles) with a weight of 0.5 kg, a particle size of 1 mm and a resistance of 10Ω is laid in the discharging chamber, then 2 kg of the waste lithium ion batteries are uniformly placed in the discharging chamber. The waste lithium ion batteries are waste lithium ion batteries having aluminium shells. The rated capacity of the waste lithium ion batteries is 75 Ah and the open-circuit voltage of the waste lithium ion batteries is 3.9 V. Remaining spherical carbon particles and iron particles are added. The spherical carbon particles and iron particles and the waste lithium batteries are mixed by vibration. A total weight of the spherical carbon particles and iron particles is 1 kg.

S2: The waste lithium ion batteries and the conductive particles are compacted at the pressurization pressure of 100000 Pa, so that the waste lithium ion batteries discharge. The internal resistance of the discharge chamber calculated is 0.5Ω according to the pressurization pressure. The discharge rate of the waste lithium ion batteries calculated is 0.1 C according to the battery voltage and the rated capacity of the waste lithium ion batteries. The pressurization pressure is dynamically adjusted to keep the discharge rate of the waste lithium ion batteries to be 0.1 C. The discharge chamber is blown by the air cooling device to dissipate heat. The air volume of the air cooling device ranges from 1000 m³/h. At the same time, the internal temperature of the discharge chamber is monitored in real time. and the internal temperature of the discharge chamber maintains lower than 60° C.

S3: The internal temperature of the discharge chamber is reduced to the room temperature after 8 h of discharge of the waste lithium ion batteries, and the waste lithium ion batteries continue to discharge to complete discharge of the waste lithium ion batteries.

The above-mentioned embodiments of the present disclosure are only a part of optional embodiments of the present disclosure, and cannot be limited thereto. Any modification, equivalent replacement, and improvement made by those skilled in the art, without departing from the essence of the present disclosure, belong to the protection scope of the present disclosure.

What is claimed is:

1. A safe discharge method for waste lithium ion batteries, comprising following steps:

S1: uniformly mixing the waste lithium ion batteries and conductive particles in a discharge chamber according to a weight ratio of 1:5-2:1; wherein a resistance of the conductive particles ranges from 0.1-20Ω; a particle size of the conductive particles ranges from 1-10 mm;

S2: compacting the waste lithium ion batteries and the conductive particles at a pressurization pressure of 1000-100000 Pa, so that the waste lithium ion batteries discharge; calculating an internal resistance of the discharge chamber in real time according to the pressurization pressure; calculating a discharge rate of the waste lithium ion batteries in combination with a battery voltage and a rated capacity of the waste lithium ion batteries; dynamically adjusting the pressurization pressure to keep the discharge rate of the waste lithium ion batteries to be 0.1-3 C; monitoring an internal temperature of the discharge chamber in real time; when the internal temperature of the discharge chamber is greater than an early warning temperature, reducing the pressurization pressure by 20%-60%; when the internal temperature of the discharge chamber is greater than a warning temperature, relieving the pressurization pressure to 0 Pa, reducing the pressurization pressure by 60%-90% after the internal temperature of the discharge chamber drops below the early warning temperature; and re-compacting the waste lithium ion batteries and the conductive particles to discharge the waste lithium ion batteries; and S3: completing discharge of the waste lithium ion batteries, when the battery voltage of the waste lithium ion batteries is reduced to 0.5-1.5 V, or when the waste lithium ion batteries are discharged for 1-4 h after the internal temperature of discharge chamber is reduced to room temperature;

wherein in the step S2, a process of dynamically adjusting the pressurization pressure is represented by:

$C = U/(R*Ca);$ $R = R_0 + R_j;$ $R_j = K/F^m;$ wherein C is the discharge rate of the waste lithium ion batteries; U is the battery voltage of the waste lithium ion batteries; Ca is the rated capacity of the waste lithium ion batteries; R is the internal resistance of the discharge chamber; $R_0$ is the resistance of the conductive particles; $R_j$ is a contact resistance between the conductive particles; F is the pressurization pressure, K is a constant related to a contact material, a contact surface processing method, and a contact surface condition; m is a constant related to a contact form, and m is 0.5-0.7.

2. The safe discharge method for the waste lithium ion batteries according to claim 1, wherein in the step S1, the conductive particles are one or more of copper particles, aluminum particles, iron particles, alloy particles, and carbon particles; the alloy particles are copper-iron-aluminum alloy particles.

3. The safe discharge method for the waste lithium ion batteries according to claim 1, wherein in the step S2, during discharging of the waste lithium ion batteries, the discharge chamber is blown by an air cooling device to dissipate heat.

4. The safe discharge method for the waste lithium ion batteries according to claim 3, wherein an air volume of the air cooling device ranges from 50~2000 m³/h.

5. The safe discharge method for the waste lithium ion batteries according to claim 1, wherein in the step S2, the early warning temperature is 60° C.

6. The safe discharge method for the waste lithium ion batteries according to claim 1, wherein in the step S2, the warning temperature is 80° C.

* * * * *